US012783294B2

(12) United States Patent
Wang

(10) Patent No.: US 12,783,294 B2
(45) Date of Patent: Nov. 3, 2026

(54) MULTI-INSTRUCTION ENGINE-BASED INSTRUCTION PROCESSING METHOD AND PROCESSOR

(71) Applicant: Huawei Technologies Co., Ltd., Shenzhen (CN)

(72) Inventor: Jin Wang, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 549 days.

(21) Appl. No.: 18/309,177

(22) Filed: Apr. 28, 2023

(65) Prior Publication Data

US 2023/0267002 A1 Aug. 24, 2023

Related U.S. Application Data

(63) Continuation of application No. PCT/CN2020/125404, filed on Oct. 30, 2020.

(51) Int. Cl.
*G06F 9/48* (2006.01)
*G06F 9/30* (2018.01)

(52) U.S. Cl.
CPC ........ *G06F 9/4881* (2013.01); *G06F 9/30047* (2013.01)

(58) Field of Classification Search
CPC ........................... G06F 9/4881; G06F 9/30047
See application file for complete search history.

(56) References Cited

U.S. PATENT DOCUMENTS 9,298,504 B1* 3/2016 Vincent ................... G06F 9/505
11,249,807 B2* 2/2022 Kipp ......................... G06F 9/50
2005/0102474 A1 5/2005 Lakshmanamurthy et al.
2015/0324234 A1* 11/2015 Chang ................... G06F 9/5033 718/104
2020/0210230 A1* 7/2020 Rosen ..................... G06F 9/505

(Continued)

FOREIGN PATENT DOCUMENTS

CN 110618966 A 12/2019
CN 111352711 A 6/2020

OTHER PUBLICATIONS

"Liu, Guo-ding, A Processor and Thread Processing Method, May 24, 2019, CN 201711146942 A" (Year: 2019).*

*Primary Examiner* — Chat C Do
*Assistant Examiner* — Selina Elisa Hu
(74) *Attorney, Agent, or Firm* — Conley Rose, P.C.

(57) ABSTRACT

A processor includes a program block dispatcher, an instruction cache group, and an instruction engine group. A plurality of instruction caches in the instruction cache group are in a one-to-one correspondence with a plurality of instruction engines in the instruction engine group. In a method, the program block dispatcher determines, based on an instruction processing request for processing a first instruction set, a first instruction engine for processing the first instruction set; and determines, based on the one-to-one correspondence between the instruction engines and the instruction caches, a first instruction cache configured to cache the first instruction set. The program block dispatcher sends a program counter in the instruction processing request to the first instruction cache. The first instruction engine obtains the first instruction set from the first instruction cache, to execute an instruction in the first instruction set.

20 Claims, 4 Drawing Sheets

(56) References Cited

U.S. PATENT DOCUMENTS

| | | | | |
|---|---|---|---|---|
| 2020/0233706 | A1* | 7/2020 | Smith | G06F 9/5066 |
| 2020/0401444 | A1* | 12/2020 | Hirota | G06F 9/52 |
| 2021/0294649 | A1* | 9/2021 | Sakthivel | G06T 1/20 |

* cited by examiner

MULTI-INSTRUCTION ENGINE-BASED INSTRUCTION PROCESSING METHOD AND PROCESSOR

CROSS-REFERENCE TO RELATED APPLICATIONS

This application is a continuation of International Patent Application No. PCT/CN2020/125404 filed on Oct. 30, 2020, the disclosure of which is hereby incorporated by reference in its entirety.

TECHNICAL FIELD

The present disclosure relates to the field of computer technologies, and in particular, to a multi-instruction engine-based instruction processing method and a processor.

BACKGROUND

With application of a fifth generation (5G) mobile communication technology, a processor has evolved into a processor with a plurality of instruction engines (IEs) for concurrent execution, to be specific, a quantity of instructions concurrently executed by the processor in one cycle is increasing. The processor has higher requirements for instruction fetch bandwidth and an instruction fetch delay. Therefore, a single cache cannot meet an instruction fetch requirement of the processor with the plurality of IEs, and the instruction fetch bandwidth needs to be increased by using a multi-cache solution.

In a current solution of increasing instruction fetch bandwidth by using a plurality of caches, a plurality of IEs share the plurality of caches. When a new instruction processing request is received, an IE that executes the instruction processing request is determined based on a queue depth of an instruction queue (Inst Q) corresponding to each IE. Then, a cache that caches an instruction corresponding to a program counter is determined based on the program counter (PC) in the instruction processing request. The instruction is obtained from the cache, and sent to the corresponding IE for processing through a crossbar.

Therefore, in the current multi-cache solution, a cache in which an instruction is cached is determined based on a PC of the instruction. In addition, during continuous instruction fetching, instructions need to be cyclically fetched from the plurality of caches. As a result, instruction fetch requests may be unevenly allocated to the plurality of caches, thereby causing a problem that processing performance of the processor deteriorates and execution efficiency of the processor is low.

SUMMARY

Embodiments of the present disclosure provide a multi-instruction engine-based instruction processing method and a processor, to improve instruction execution efficiency and resource utilization of the processor, thereby reducing costs and power consumption.

To achieve the foregoing objectives, the following technical solutions are used in embodiments of the present disclosure.

According to a first aspect, an embodiment of the present disclosure provides a multi-instruction engine-based instruction processing method. The instruction processing method is applied to a processor. The processor includes a program block dispatcher, an instruction cache group, and an instruction engine group. The instruction cache group includes a plurality of instruction caches (for example, a cache 0 to a cache 15), and the instruction engine group includes a plurality of instruction engines (for example, an IE 0 to an IE 15). The plurality of instruction caches in the instruction cache group are in a one-to-one correspondence with the plurality of instruction engines in the instruction engine group (for example, the cache 0 corresponds to the IE 0, a cache 1 corresponds to an IE 1, and the rest may be deduced by analogy). The instruction processing method includes: The program block dispatcher receives an instruction processing request, where the instruction processing request is used to request the processor to process a first instruction set. The program block dispatcher determines a first instruction engine based on the instruction processing request, where the first instruction engine is an instruction engine that processes the first instruction set in the instruction engine group. The program block dispatcher sends the instruction processing request to a first instruction cache corresponding to the first instruction engine. The first instruction engine obtains the first instruction set from the first instruction cache.

It should be noted that the program block dispatcher includes a program block table, and the program block table records an instruction engine to which each program block in a program can be mapped (allocated). The instruction engine to which each program block can be mapped (allocated) may be determined based on a program block identifier (PBID) in the instruction processing request. For example, the instruction engine for processing each program block may be determined according to a specific rule. In addition, the program block dispatcher further includes a plurality of instruction processing request queues, the plurality of instruction processing request queues are in a one-to-one correspondence with the plurality of instruction engines, and the plurality of instruction processing request queues are in a one-to-one correspondence with the plurality of instruction caches, thereby implementing a one-to-one correspondence between the instruction engines and the instruction caches. In addition, an instruction engine and a corresponding instruction cache may be connected through a hardware interface, to help transmit an instruction.

Based on the multi-instruction engine-based instruction processing method provided in the first aspect, the program block dispatcher determines, based on the instruction processing request for processing the first instruction set, the first instruction engine for processing the first instruction set; and determines, based on the one-to-one correspondence between the instruction engines and the instruction caches, the first instruction cache configured to cache the first instruction set. The program block dispatcher sends a PC in the instruction processing request to the first instruction cache. The first instruction engine obtains the first instruction set from the first instruction cache, to execute an instruction in the first instruction set. In this solution, each instruction engine may exclusively use a service of one instruction cache, so that the processor has stable and determined instruction fetch bandwidth, thereby improving instruction execution efficiency of the processor. In addition, when a program is executed by the processor, instructions in the program are divided into blocks, and different program blocks are sequentially allocated to different IEs for execution based on an execution sequence of the program, so that resource utilization of the processor can be improved, and replication of instructions between instruction caches can be reduced. This reduces costs and power consumption.

In a possible implementation of the first aspect, that the program block dispatcher determines a first instruction engine based on the instruction processing request may include: The program block dispatcher obtains an alternative instruction engine of the first instruction set based on the instruction processing request, where the alternative instruction engine is an instruction engine that can be configured to process the first instruction set. The program block dispatcher selects an instruction engine from the alternative instruction engine as the first instruction engine. It may be understood that the alternative instruction engine may be predetermined, to be specific, may be obtained from the program block table in the program block dispatcher. In the program block table, a mapping relationship between each program block and an instruction engine may generally be allocated and configured based on a feature of a to-be-executed program, for example, may be allocated based on a uniformity degree of a quantity of instructions processed by each instruction engine. For example, a performance path of a to-be-executed program has three program blocks: PBID=0, PBID=1, and PBID=2. It is assumed that both the program block PBID=0 and the program block PBID=1 include 24 instructions, and the program block PBID=2 includes 48 instructions. Therefore, both the program block PBID=0 and the program block PBID=1 may be allocated to the IE 0 for execution, and the program block PBID=2 may be allocated to the IE 1 for execution, so that quantities of instructions that need to be executed by different IEs are as even as possible. Therefore, in this possible implementation, instruction execution efficiency and resource utilization of the processor can be further improved.

Optionally, the instruction engine group may include a first alternative instruction engine group. That the program block dispatcher obtains an alternative instruction engine of the first instruction set based on the instruction processing request may include: If the first instruction set is an instruction set on a non-performance path, the program block dispatcher uses an instruction engine in the first alternative instruction engine group as the alternative instruction engine of the first instruction set. In this optional solution, because a program block on the non-performance path is mainly used to process an exception and process a protocol packet, if a to-be-executed program block is a program block on the non-performance path, regardless of whether an instruction engine is congested or not, the instruction engine is directly selected from a pre-allocated instruction engine group (for example, a static IE group) in the program block table, and another instruction engine is not extended, thereby further reducing instruction execution costs and power consumption of the processor.

Alternatively, optionally, the instruction engine group may include a first alternative instruction engine group and a second instruction engine group. That the program block dispatcher obtains an alternative instruction engine of the first instruction set based on the instruction processing request may include: If the first instruction set is an instruction set on a performance path, the program block dispatcher uses an instruction engine in the first alternative instruction engine group or an instruction engine in the second instruction engine group as the alternative instruction engine of the first instruction set. The first alternative instruction engine group is a static IE group preconfigured in the program block table, and the second instruction engine group is a set of other instruction engines in the processor except IEs in the static IE group. In this optional solution, because a program block on the performance path belongs to a program that is mainly executed in an entire program, if a to-be-executed program block is a program block on the performance path, an instruction engine may be preferentially selected from the pre-allocated first alternative instruction engine group in the program block table. If all instruction engines in the pre-allocated first alternative instruction engine group are in a congested state, extension may be performed from another instruction engine of the processor, for example, the second instruction engine group, to ensure that sufficient resources are available to process the program block on the performance path, thereby further improving instruction execution efficiency of the processor.

Further, that the program block dispatcher uses an instruction engine in the first alternative instruction engine group or an instruction engine in the second instruction engine group as the alternative instruction engine of the first instruction set may include: If a first condition is met, the program block dispatcher uses the instruction engine in the first alternative instruction engine group as the alternative instruction engine of the first instruction set. The first condition may be that a queue depth of an instruction processing request queue corresponding to at least one instruction engine in the first alternative instruction engine group is less than a first preset threshold. Alternatively, if a second condition is met, the program block dispatcher uses the instruction engine in the second instruction engine group as the alternative instruction engine of the first instruction set. The second condition may be that queue depths of instruction processing request queues corresponding to all instruction engines in the first alternative instruction engine group exceed the first preset threshold. In this further solution, the first preset threshold is preconfigured to determine whether the instruction engine in the first alternative instruction engine group is congested. The first preset threshold may be changed based on an actual situation of the processor. In this way, instruction execution efficiency of the processor can be improved while ensuring minimum power consumption of the processor.

Further, the second instruction engine group may include a second alternative instruction engine group and a third alternative instruction engine group. That the program block dispatcher uses an instruction engine in the second instruction engine group as the alternative instruction engine of the first instruction set may include: The program block dispatcher uses an instruction engine in the second alternative instruction engine group of the second instruction engine group as the alternative instruction engine of the first instruction set. If a third condition is met, the program block dispatcher adds at least one instruction engine in the third alternative instruction engine group to the second alternative instruction engine group. The third condition may be that the second alternative instruction engine group is empty, or queue depths of instruction processing request queues corresponding to all instruction engines in the second alternative instruction engine group exceed a second preset threshold. In this further solution, the second instruction engine group may be divided into the second alternative instruction engine group and the third alternative instruction engine group, where the second alternative instruction engine group is a dynamic IE group and is in an enabled state, and the third alternative instruction engine group is a disabled engine group. When an enabled instruction engine in the processor has few execution tasks, some instruction engines in the processor may be disabled, thereby reducing power consumption of the processor. When all instruction engines in the second alternative instruction engine group, that is, the dynamic IE group, are in the congested state, an instruction engine in the third alternative instruction engine group may be enabled, to improve instruction execution efficiency of the processor.

Optionally, the program block dispatcher selects, in the third alternative instruction engine group, at least one instruction engine corresponding to an instruction processing request queue whose queue depth is less than a third preset threshold, and adds the at least one instruction engine to the second alternative instruction engine group. In this optional solution, when an instruction engine is extended from the third alternative instruction engine group, an instruction engine corresponding to an instruction processing request queue whose queue depth is less than the third preset threshold is selected, that is, an instruction engine that is not congested is extended, to improve instruction execution efficiency.

Optionally, the instruction processing method in the first aspect may further include: The program block dispatcher records an instruction engine selection difference. If the instruction engine selection difference exceeds a fourth preset threshold, the program block dispatcher deletes all instruction engines in the second alternative instruction engine group. The instruction engine selection difference indicates a quantity difference between a quantity of times of selecting an instruction engine from the first alternative instruction engine group and a quantity of times of selecting an instruction engine from the second alternative instruction engine group. In this optional solution, to reduce power consumption of the processor, for a program block to which the first instruction set belongs, if the program block selects an instruction engine IE from the second alternative instruction engine group, that is, the dynamic IE group, for a very small quantity of times, an instruction engine in the dynamic IE group may be deleted, to reduce power consumption of the processor.

Further, that the program block dispatcher selects an instruction engine from the alternative instruction engine as the first instruction engine may include: The program block dispatcher obtains a queue depth of an instruction processing request queue corresponding to the alternative instruction engine. The program block dispatcher selects an alternative instruction engine corresponding to an instruction processing request queue with a minimum queue depth as the first instruction engine. In the further solution, the instruction engine that finally executes the first instruction set is determined from the alternative instruction engine, and the alternative instruction engine corresponding to the instruction processing request queue with the minimum queue depth is selected. In this way, a quantity of instructions to be executed in each instruction engine can be lower, which helps improve resource utilization of the processor and improve execution efficiency of the processor.

In a possible implementation, the instruction processing method in the first aspect may further include: When the first instruction cache detects an end indicator of the first instruction set, the first instruction cache sends scheduling information to the program block dispatcher, where the scheduling information indicates that the first instruction engine may process a next instruction processing request. In this way, the next instruction processing request may be fetched from an instruction processing request queue corresponding to the first instruction engine by using a round robin scheduler in the program block dispatcher, so that the first instruction engine can process the next instruction processing request, to sequentially execute instructions, thereby improving efficiency of the processor.

According to a second aspect, an embodiment of the present disclosure provides a processor. The processor includes a program block dispatcher, an instruction cache group, and an instruction engine group. The instruction cache group includes a plurality of instruction caches, and the instruction engine group includes a plurality of instruction engines. The plurality of instruction caches in the instruction cache group are in a one-to-one correspondence with the plurality of instruction engines in the instruction engine group. The program block dispatcher is configured to receive an instruction processing request, where the instruction processing request is used to request the processor to process a first instruction set. The program block dispatcher is configured to determine a first instruction engine based on the instruction processing request, where the first instruction engine is an instruction engine that processes the first instruction set in the instruction engine group, and the first instruction engine corresponds to a first instruction cache in the instruction cache group. The program block dispatcher is configured to send the instruction processing request to the first instruction cache corresponding to the first instruction engine. The first instruction engine is configured to obtain the first instruction set from the first instruction cache.

Optionally, the processor further includes a plurality of instruction processing request queues, the plurality of instruction processing request queues are in a one-to-one correspondence with the plurality of instruction engines, and the plurality of instruction processing request queues are in a one-to-one correspondence with the plurality of instruction caches. The program block dispatcher is configured to determine, based on an instruction processing request queue corresponding to the first instruction engine, the first instruction cache corresponding to the first instruction engine. In this way, a one-to-one correspondence between the plurality of instruction engines and the plurality of instruction caches can be implemented by using the one-to-one correspondences of the instruction processing request queues.

In a possible implementation of the second aspect, the program block dispatcher may be further configured to obtain an alternative instruction engine of the first instruction set based on the instruction processing request, where the alternative instruction engine is an instruction engine that can be configured to process the first instruction set. An instruction engine is selected from the alternative instruction engine as the first instruction engine.

Optionally, the instruction engine group may include a first alternative instruction engine group. The instruction engine group is further configured to: if the first instruction set is an instruction set on a non-performance path, use an instruction engine in the first alternative instruction engine group as the alternative instruction engine of the first instruction set.

Optionally, the instruction engine group may include a first alternative instruction engine group and a second instruction engine group. The program block dispatcher is further configured to: if the first instruction set is an instruction set on a performance path, use an instruction engine in the first alternative instruction engine group or an instruction engine in the second instruction engine group as the alternative instruction engine of the first instruction set.

Further, the program block dispatcher may be further configured to: if a first condition is met, use the instruction engine in the first alternative instruction engine group as the alternative instruction engine of the first instruction set, where the first condition may be that a queue depth of an instruction processing request queue corresponding to at least one instruction engine in the first alternative instruction engine group is less than a first preset threshold; or if a second condition is met, use the instruction engine in the second instruction engine group as the alternative instruction engine of the first instruction set, where the second condition may be that queue depths of instruction processing request queues corresponding to all instruction engines in the first alternative instruction engine group exceed the first preset threshold.

Further, the second instruction engine group may include a second alternative instruction engine group and a third alternative instruction engine group. The program block dispatcher may be further configured to: use an instruction engine in the second alternative instruction engine group of the second instruction engine group as the alternative instruction engine of the first instruction set; and if a third condition is met, add at least one instruction engine in the third alternative instruction engine group to the second alternative instruction engine group. The third condition may be that the second alternative instruction engine group is empty, or queue depths of instruction processing request queues corresponding to all instruction engines in the second alternative instruction engine group exceed a second preset threshold.

Optionally, the program block dispatcher may be further configured to: select, in the third alternative instruction engine group, at least one instruction engine corresponding to an instruction processing request queue whose queue depth is less than a third preset threshold, and add the at least one instruction engine to the second alternative instruction engine group.

Optionally, the program block dispatcher may be further configured to record an instruction engine selection difference. If the instruction engine selection difference exceeds a fourth preset threshold, all instruction engines in the second alternative instruction engine group are deleted. The instruction engine selection difference indicates a quantity difference between a quantity of times of selecting an instruction engine from the first alternative instruction engine group and a quantity of times of selecting an instruction engine from the second alternative instruction engine group.

In a possible implementation, the program block dispatcher may be further configured to: obtain a queue depth of an instruction processing request queue corresponding to the alternative instruction engine; and select an alternative instruction engine corresponding to an instruction processing request queue with a minimum queue depth as the first instruction engine.

In a possible implementation, the first instruction cache may be further configured to: when detecting an end indicator of the first instruction set, send scheduling information to the program block dispatcher, where the scheduling information indicates that the first instruction engine may process a next instruction processing request.

Optionally, a cache length of a single cache unit in each instruction cache in the instruction cache group is consistent with a quantity of instructions that can be processed in a single execution cycle of a corresponding instruction engine. An example in which the instruction cache is a cache is used. The cache length of the single cache unit in each instruction cache refers to a length of a cache line in each cache, and the quantity of instructions that can be processed in the single execution cycle of the instruction engine is a size of an arithmetic logic unit (ALU) array that can be processed by the instruction engine in the single execution cycle. For example, if a size of an ALU array that can be processed by an instruction engine IE in a single execution cycle is four instructions, a length of a cache line in a cache corresponding to the instruction engine is also designed to cache four instructions. In this way, no Inst Q is required between the instruction engine IE and the cache to cache an instruction, thereby reducing costs and power consumption.

According to a third aspect, an embodiment of the present disclosure provides an electronic device. The electronic device includes a processor and a memory coupled to the processor, where the processor is the processor provided in any possible implementation of the second aspect.

It may be understood that any processor or electronic device provided in the foregoing multi-instruction engine-based instruction processing method is configured to perform the multi-instruction engine-based instruction processing method provided in the foregoing first aspect. Therefore, for beneficial effects that can be achieved, refer to beneficial effects in the multi-instruction engine-based instruction processing method provided in the first aspect. Details are not described herein again.

DESCRIPTION OF EMBODIMENTS

Figure 1:
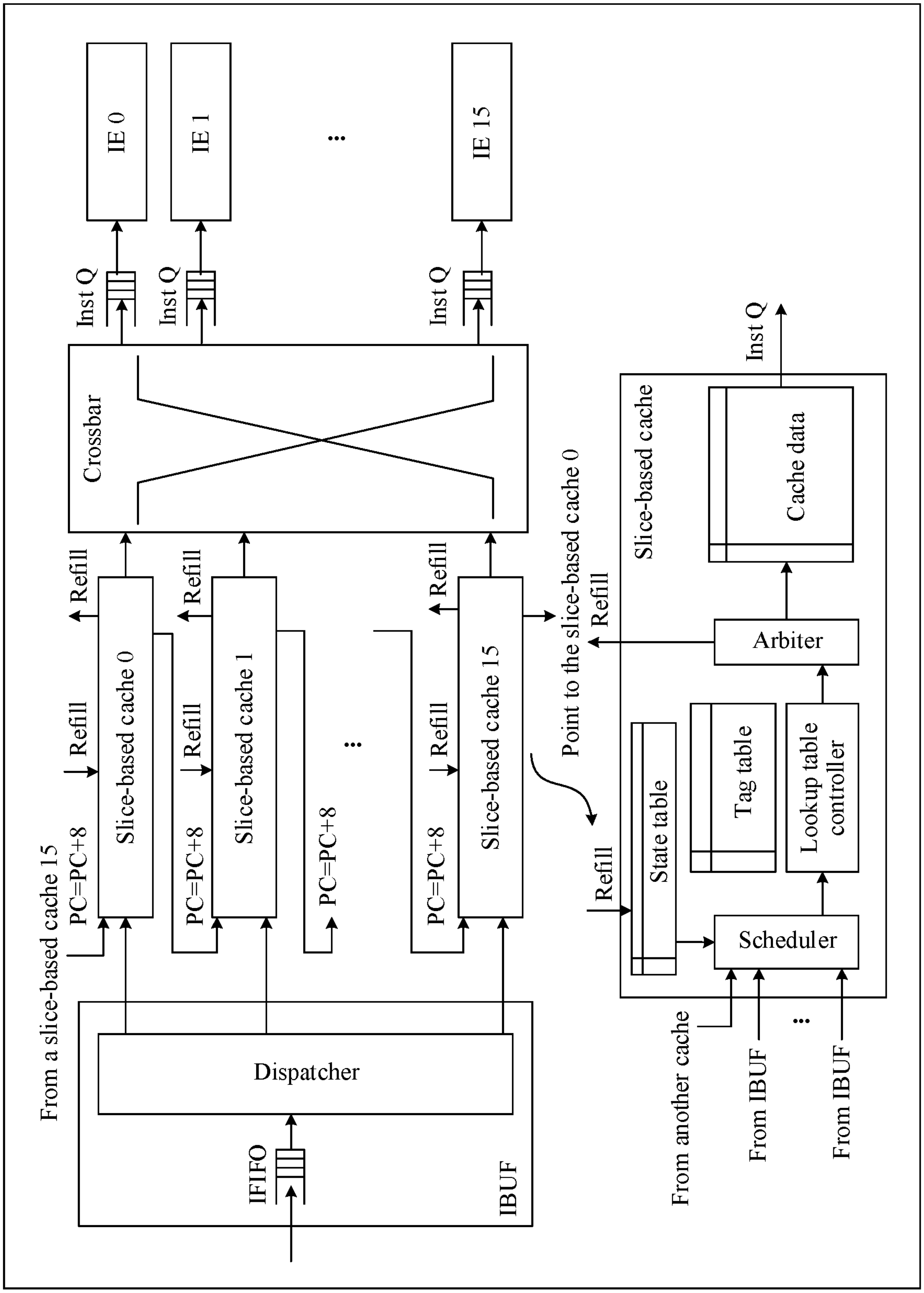
FIG. 1 is a schematic diagram of a structure of a processor with a plurality of caches and a plurality of instruction engines.

FIG. 1 is a schematic diagram of a structure of a processor with a plurality of caches and a plurality of instruction engines. In a solution shown in FIG. 1, the processor includes an instruction buffer (IBUF), a plurality of slice-based caches, a crossbar, a plurality of IEs, and Inst Q in a one-to-one correspondence with the plurality of instruction engines IEs. In the plurality of slice-based caches, an instruction is stored in the following manner: A slice-based cache 0 to a slice-based cache 15 are used as examples. It is assumed that a length of each cache line in a cache is eight instructions. If an instruction corresponding to a PC is stored in the slice-based cache 0, an eighth instruction following the instruction corresponding to the PC (namely, an instruction corresponding to PC+8) is stored in a slice-based cache 1, and the rest may be deduced by analogy. If an instruction corresponding to a PC is stored in the slice-based cache 15, an eighth instruction following the instruction corresponding to the PC (namely, an instruction corresponding to PC+8) is stored in the slice-based cache 0.

A specific processing procedure is as follows.

After the instruction buffer IBUF receives an instruction fetch request including the PC, the instruction fetch request is cached in an instruction first in first out (IFIFO) queue. A dispatcher (DISP) in the instruction buffer IBUF reads the instruction fetch request from the IFIFO queue and allocates the instruction fetch request to an execution thread corresponding to an instruction engine IE. Each instruction engine IE corresponds to one execution thread.

The following requirements need to be met when the instruction fetch request is allocated to the execution thread corresponding to the instruction engine IE: (1) The execution thread has completed a previous instruction fetch request; and (2) If there are a plurality of execution threads that the instruction fetch request can be allocated, the instruction fetch request is allocated based on a queue depth of an instruction queue Inst Q corresponding to the instruction engine IE, and is preferentially allocated to an execution thread corresponding to an instruction engine IE corresponding to an instruction queue Inst Q with a minimum queue depth.

After the instruction fetch request is allocated to the execution thread, the dispatcher DISP sends the PC in the instruction fetch request to a corresponding cache to read the instruction based on the PC. After the cache receives the PC and the instruction fetch request is scheduled by a scheduler (SCH), the PC enters a cache pipeline. In the pipeline, a tag table is first looked up by using a tag lookup controller, and then arbitration is performed by an arbiter (ARB). The tag table is used to record a correspondence between the PC and instruction data cached in the cache. Whether a correspondence exists between the PC and a cache unit (for example, a cache line) in the cache may be determined by looking up the tag table. If the correspondence exists, it is considered that the PC is hit. If the correspondence does not exist, it is considered that the PC is not hit. The arbiter ARB is configured to determine a hit result obtained from the tag table, and determine whether the instruction corresponding to the PC is hit in the cache. After arbitration, if the instruction corresponding to the PC is hit in the cache, the instruction is obtained from a cache data module in the cache, and sent to a bound IE through the crossbar. If the instruction corresponding to the PC is not hit in the cache, a refill request, which may also be referred to as a backfill request, is initiated to an instruction memory (IMEM). The refill request is used to request to obtain an instruction from the IMEM and re-learn the instruction to a corresponding cache. After the cache fetches the instruction from the IMEM, the tag table is updated.

If there is no end indicator (EI) (which may be obtained by looking up the tag table) after the instruction corresponding to the PC, 8 is added to the PC and an instruction fetch request is initiated to a next cache. A scheduler of the next cache schedules the instruction fetch request based on a state table, and the PC enters a pipeline of the next cache (a process after entering the cache pipeline is described above, and details are not described herein again).

If the backfill request reads the instruction from the instruction memory and returns to the cache, the scheduler of the cache initiates an instruction backfill request based on the state table, and fills the corresponding instruction into a cache data module. Information related to the instruction is recorded in the tag table, and the instruction is sent to the IE through the crossbar.

If the instruction fetched from the cache has an EI indicator, it indicates that a current PC has finished instruction fetching. If there is still a PC waiting to fetch an instruction in an execution thread corresponding to the current PC, a new PC is used in the execution thread to continue fetching the instruction. If there is no PC waiting to fetch an instruction in the execution thread, it indicates that all instruction fetch operations have been completed for the current instruction fetch request, and a next instruction fetch request can be processed.

It should be noted that, in the solution in FIG. 1, a cache in which an instruction is cached is related to a PC of the instruction. In addition, during continuous instruction fetching, instructions need to be cyclically fetched from a plurality of caches. As a result, instruction fetch requests may be unevenly allocated to the plurality of caches, thereby causing a problem that processing performance of a processor deteriorates and execution efficiency of the processor is low.

In addition, because a plurality of IEs share a plurality of caches, data transmission needs to be performed between the caches and the IEs through a crossbar, resulting in high hardware costs and power consumption.

In this application, "at least one" means one or more, and "a plurality of" means two or more. The term "and/or" describes an association relationship between associated objects, and indicates that three relationships may exist. For example, A and/or B may indicate the following three cases: A exists alone, both A and B exist, and B exists alone, where A and B may be singular or plural. "At least one of the following items (pieces)" or a similar expression thereof refers to any combination of these items, including any combination of singular items (pieces) or plural items (pieces). For example, at least one item (piece) of a, b, or c may represent a, b, c, a and b, a and c, b and c, or a, b, and c, where a, b, and c each may be singular or plural. The character "/" generally indicates an "or" relationship between the associated objects. In addition, in embodiments of the present disclosure, words such as "first" and "second" do not limit a quantity and an execution order.

It should be noted that, in this application, words "example" or "for example" are used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

In addition, before embodiments of the present disclosure are described, technical terms in embodiments of the present disclosure are first described.

A performance path is a most important execution path in a program.

A non-performance path is an execution path for processing an exception or processing a protocol packet in a program.

Figure 2:
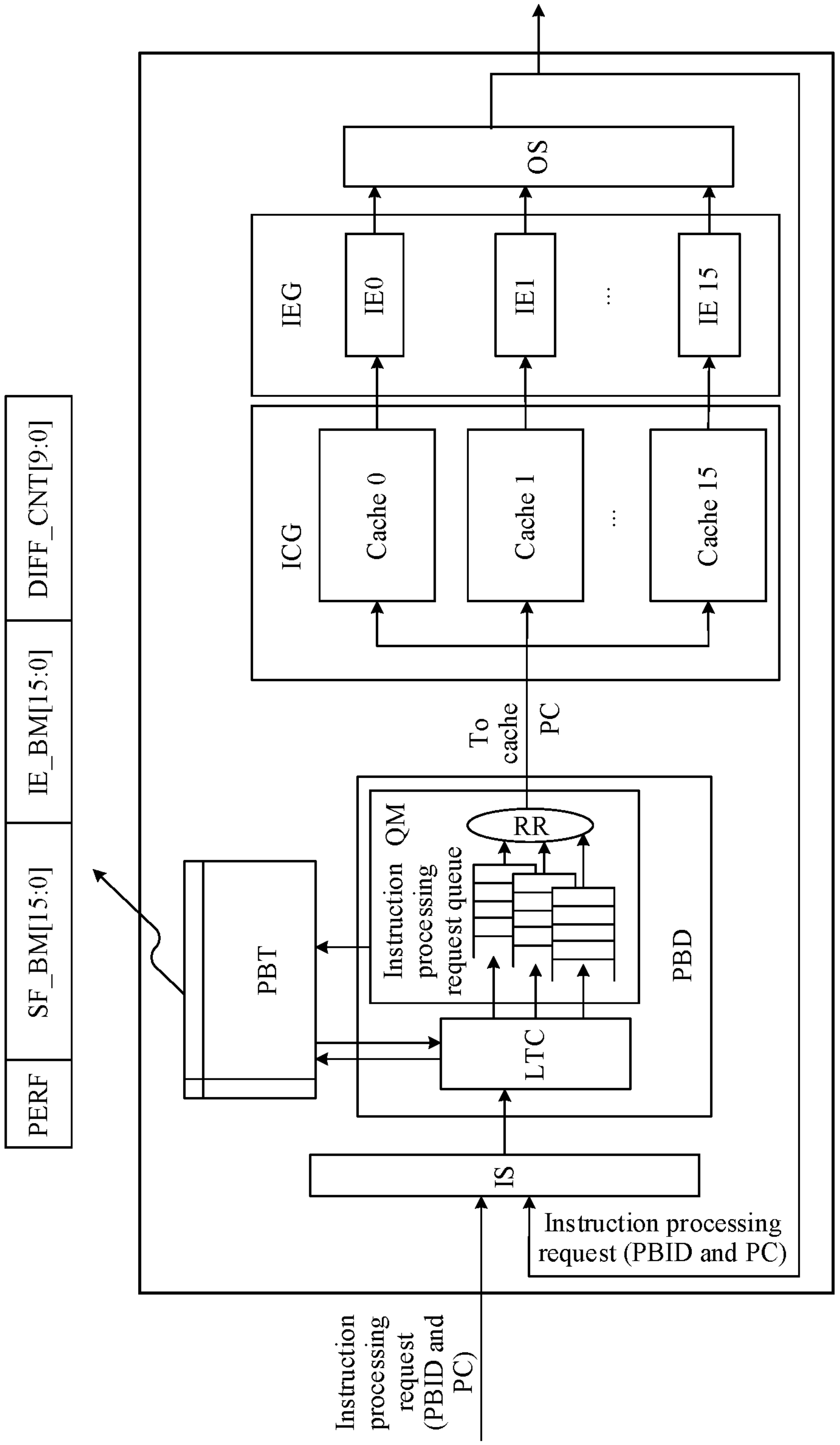
FIG. 2 is a schematic diagram of a structure of a processor with a plurality of caches and a plurality of instruction engines according to an embodiment of the present disclosure.

FIG. 2 is a schematic diagram of a structure of a processor with a plurality of caches and a plurality of instruction engines according to an embodiment of the present disclosure. The processor includes a program block dispatcher (PBD), an instruction cache group (ICG), and an instruction engine group (IEG). The instruction cache group includes a plurality of instruction caches, and the instruction caches may be caches, for example, a cache 0 to a cache 15. The instruction engine group includes a plurality of IEs, for example, an IE 0 to an IE 15. The plurality of instruction caches in the instruction cache group are in a one-to-one correspondence with the plurality of instruction engines in the instruction engine group. In other words, each IE exclusively uses one instruction cache, and the IEs are bound to the instruction caches one by one, so that each IE has stable and determined instruction fetch bandwidth.

It should be noted that the processor may further include a plurality of instruction processing request queues, the plurality of instruction processing request queues are in a one-to-one correspondence with the plurality of instruction engines, and the plurality of instruction processing request queues are in a one-to-one correspondence with the plurality of instruction caches. In other words, each IE may correspond to one instruction processing request queue (IE-based queue), and each instruction request queue corresponds to one instruction cache, to implement a one-to-one correspondence between the instruction processing request queue and the instruction cache. In addition, an instruction engine and a corresponding instruction cache may be connected through a hardware interface, to help transmit an instruction. It should be understood that all the instruction processing request queues may be managed by a queue management QM.

To reduce costs and power consumption, a cache length of a single cache unit in each instruction cache in the instruction cache group may be consistent with a quantity of instructions that can be processed in a single execution cycle of a corresponding instruction engine. An example in which the instruction cache is a cache is used. The cache length of the single cache unit in each instruction cache refers to a length of a cache line in each cache, and the quantity of instructions that can be processed in the single execution cycle of the instruction engine is a size of an ALU array that can be processed by the instruction engine in the single execution cycle. For example, if a size of an ALU array that can be processed by an instruction engine IE in a single execution cycle is four instructions, a length of a cache line in a cache corresponding to the instruction engine is also designed to cache four instructions. In this way, no Inst Q is required between the instruction engine IE and the cache to cache an instruction, thereby reducing costs and power consumption.

Certainly, if the cache length of the single cache unit in each instruction cache in the instruction cache group is inconsistent with the quantity of instructions that can be processed in the single execution cycle of the corresponding instruction engine, an instruction queue may be set between the instruction cache and the IE to cache instructions, so that the instructions are executed by the IE in sequence.

Compared with the processor shown in FIG. 1, because the instruction caches and the instruction engines are bound one by one, the processor shown in FIG. 2 does not need a crossbar. In addition, an instruction cache length of a single cache unit of an instruction cache may be set to be the same as a quantity of instructions that can be processed in a single instruction cycle of an instruction engine in which the instruction cache and the instruction engine are bound together, so that settings of the instruction queues Inst Q can be reduced, thereby reducing complexity of a processing procedure and reducing costs and power consumption of the processor.

The processor in FIG. 2 relates to the program block dispatcher. When a complete program is executed by using the processor, the program may be first divided into several program blocks, and an identifier (ID) is allocated to each program block based on an execution sequence of the program. The identifier is referred to as a program block identifier (PBID). When the program is divided into blocks, an instruction may be jumped based on an IO operation or a switch.

It should be noted that, for a complete program, the program may be divided into a plurality of different phases based on an execution sequence of the program. After the program is divided into several program blocks, each program block has only one PBID. PBIDs allocated to different program blocks in different phases are different, but may alternatively be the same. Generally, different PBIDs are allocated to different program blocks in a same phase.

In addition, based on an execution path of the program, the program may be divided into a program block on a performance path and a program block on a non-performance path. During program block allocation, program blocks in different phases on a same performance path may be evenly allocated to all IEs as much as possible. For example, program blocks in different phases on a same performance path are separately allocated to different IEs. Certainly, program blocks in different phases on the non-performance path may alternatively be evenly allocated to all IEs. In this way, processing of all program blocks on a same performance path can be prevented from being aggregated on some IEs, to avoid increasing processing burden of the IEs, and increasing burden of instruction caches corresponding to the IEs, for example, burden of caches, so as to avoid reducing hit rates of the caches. This helps improve execution efficiency and resource utilization of the processor. In addition, because different program blocks in a same phase are usually located in different branches and are generally not executed simultaneously, the different program blocks in the same phase may be allocated to a same IE.

Figure 3:
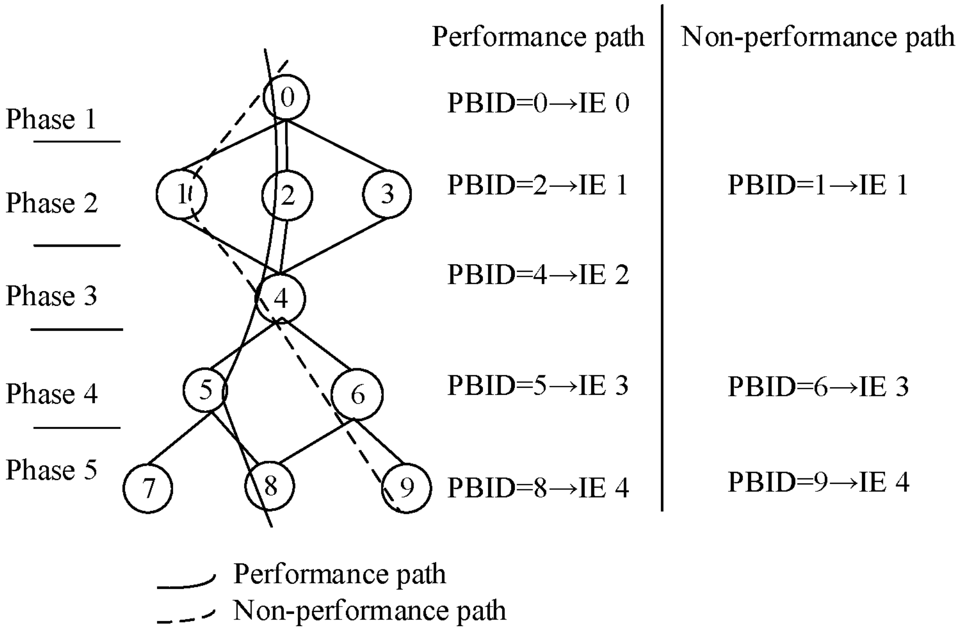
FIG. 3 is a schematic diagram of a program block allocation solution according to an embodiment of the present disclosure.

The following uses FIG. 3 as an example to describe program block allocation. FIG. 3 is a schematic diagram of a program block allocation solution according to an embodiment of the present disclosure. In an example shown in FIG. 3, a program is divided into nine program blocks. A performance path includes program blocks PBID=0, PBID=2, PBID=4, PBID=5, and PBID=8, and a non-performance path includes program blocks PBID=1, PBID=3, and PBID=4. The program is divided into five phases. A program block in a phase 1 is PBID=0. Program blocks in a phase 2 are PBID=1, PBID=2, and PBID=3. A program block in a phase 3 is PBID=4. Program blocks in a phase 4 are PBID=5 and PBID=6. Program blocks in a phase 5 are PBID=7, PBID=8, and PBID=9. Therefore, according to the foregoing IE allocation rule, for the program blocks on the performance path, IEs may be allocated according to the following solution. For example, an IE allocated to the program block PBID=0 is an IE 0, an IE allocated to the program block PBID=2 is an IE 1, an IE allocated to the program block PBID=4 is an IE 2, an IE allocated to the program block PBID=5 is an IE 3, and an IE allocated to the program block PBID=8 is an IE 4. For the program blocks on the non-performance path, IEs may be allocated according to the following solution. For example, both the program block PBID=1 and the program block PBID=2 belong to the phase 2, and therefore an IE allocated to the program block PBID=1 may also be the IE 1; both the program block PBID=5 and the program block PBID=6 belong to the phase 4, and therefore an IE allocated to the program block PBID=6 may also be the IE 3; and both the program block PBID=8 and the program block PBID=9 belong to the phase 5, and therefore an IE allocated to the program block PBID=9 may also be the IE 4.

In addition, it should be further noted that, program blocks in different phases on a same performance path are evenly allocated to IEs, which may also mean that quantities of instructions allocated to all the IEs are basically the same. For example, a performance path of a program has three program blocks: PBID=0, PBID=1, and PBID=2. It is assumed that both the program block PBID=0 and the program block PBID=1 have 24 instructions, and the program block PBID=2 has 48 instructions. Therefore, both the program block PBID=0 and the program block PBID=1 may be allocated to the IE 0 for execution, and the program block PBID=2 may be allocated to the IE 1 for execution. In this way, a quantity of instructions that need to be executed on the IE 0 is equal to that on the IE 1.

Refer to FIG. 2. The program block dispatcher includes a program block table (PBT), a lookup table controller (LTC), a queue management (QM), and a round robin (RR) scheduler.

The program block table PBT is preconfigured before the program is executed, for example, may be generated in a program compilation process. The PBT may include the following fields:

PERF is a performance path field, may indicate whether a corresponding program block is on a performance path, and occupies one bit, where 1 may indicate that the corresponding program block is on the performance path block, and 0 indicates that the corresponding program block is a program block on a non-performance path.

SF_BM is a bitmap-based static indicator, may be used to specify whether a mapping relationship between a corresponding program block and all IEs is static or dynamic (16 IEs, namely, an IE 0 to an IE 15, are used as examples), and occupies 16 bits. Each bit corresponds to one IE. To be specific, SF_BM[0] corresponds to the IE 0, SF_BM[1] corresponds to an IE 1, and the rest may be deduced by analogy. When SF_BM[x]=1, it may indicate that there is a static mapping relationship between an IEx and the program block. When SF_BM[x]=0, it may indicate that there is a dynamic mapping relationship between the IEx and the program block. For a program block and an IE that are in a static mapping relationship, the mapping relationship is not changed. For a program block and an IE that are in a dynamic mapping relationship, the mapping relationship may be changed based on a congested state of the IE.

IE_BM is an IE bitmap, may be used to specify a mapping relationship between a program block and an IE, and occupies 16 bits. Each bit corresponds to one IE. To be specific, IE_BM[0] corresponds to the IE 0, IE_BM[1] corresponds to the IE 1, and the rest may be deduced by analogy. When IE_BM[x]=1, it may indicate that the program block is mapped to an IEx, in other words, the program block can be allocated to the IEx for execution, that is, the IEx is enabled. When IE_BM[x]=0, it may indicate that the program block is not mapped to the IEx, in other words, the program block cannot be allocated to the IEx for execution, that is, the IEx is disabled, where x is an integer from 0 to 15.

DIFF_CNT records a difference between a quantity of times that the program block selects an IE from IEs in a static mapping relationship and a quantity of times that the program block selects an IE from IEs in a dynamic mapping relationship, and may indicate whether an IE that has a dynamic mapping relationship with the program block needs to be deleted. When an IE is selected from the IEs in the static mapping relationship, DIFF_CNT is increased by 1, and when an IE is selected from the IEs in the dynamic mapping relationship, DIFF_CNT is decreased by 1.

It should be noted that, when determining an IE for executing an instruction, the IE is preferentially selected from an IE set that has a static mapping relationship with a to-be-executed program block. When there is no IE that meets a requirement in the IE set that has a static mapping relationship with the to-be-executed program block, the IE may be selected from an IE set that has a dynamic mapping relationship with the to-be-executed program block. When determining the IE for executing an instruction, that the IE is in an enabled state should be ensured. Therefore, IEs may be classified into three types: a static IE group, a dynamic IE group, and a disabled IE group.

For a program block, the static IE group is a set of all IEs that have a static mapping relationship with the program block, and all the IEs in the set are enabled, in other words, IE_BM[m]=1 and SF_BM[m]=1.

The dynamic IE group is a set of all IEs that have a dynamic mapping relationship with the program block and are enabled, in other words, IE_BM[n]=1 and SF_BM[0]=0.

The disabled IE group is a set of all IEs that have a dynamic mapping relationship with the program block and are disabled, in other words, IE_BM[t]=0 and SF_BM[t]=0.

The program block dispatcher looks up the program block table by using the lookup table controller, to determine a mapping relationship between a program block and an IE in the instruction engine group, then determines, based on a queue depth of an instruction processing request queue corresponding to each IE, an IE for finally executing the program block, and then adds an instruction processing request of the program block to the instruction processing request queue corresponding to the corresponding IE, and waits for the corresponding IE for execution. The instruction processing request queue is managed by the queue management QM. The instruction processing request in the instruction processing request queue is scheduled by the RR scheduler.

In addition, the processor shown in FIG. 2 may further include an input scheduler (IS) and an output scheduler (OS). The IS is configured to receive data of a pre-stage module, which may include an instruction processing request, and is configured to schedule and allocate the instruction processing request to the program block dispatcher. The output scheduler OS is configured to receive a processing result of the program block, determine whether an entire program is executed, and schedule the instruction processing request and the instruction processing result based on an execution sequence of each program block of the entire program.

Certainly, the input scheduler and the output scheduler may alternatively be designed as one scheduler, for example, an input/output scheduler, to implement all functions of the input scheduler and the output scheduler.

Figure 4:
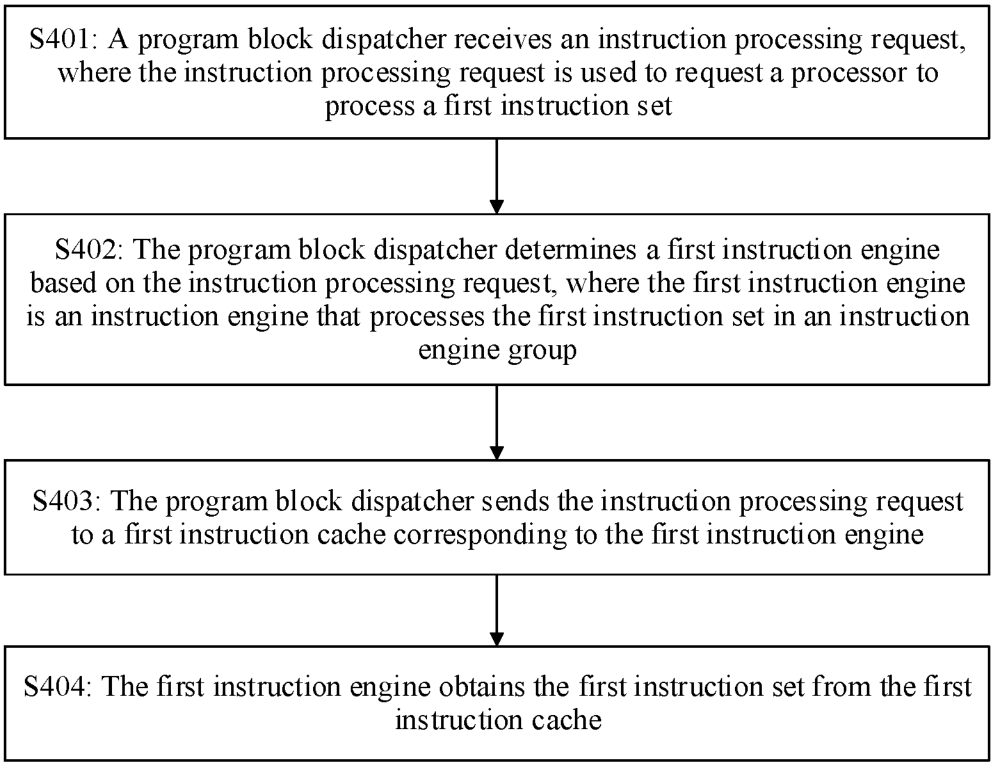
FIG. 4 is a schematic flowchart of a multi-instruction engine-based instruction processing method according to an embodiment of the present disclosure.

FIG. 4 is a schematic flowchart of a multi-instruction engine-based instruction processing method according to an embodiment of the present disclosure. The method may be applied to the processor shown in FIG. 2, and the method includes the following steps.

S401: A program block dispatcher receives an instruction processing request, where the instruction processing request is used to request the processor to process a first instruction set.

The instruction processing request may include a PBID corresponding to the first instruction set and a PC corresponding to the first instruction set. The first instruction set is a set of all instructions in a program block. The PC corresponding to the first instruction set may be used to index an instruction in the first instruction set.

S402: The program block dispatcher determines a first instruction engine based on the instruction processing request, where the first instruction engine is an instruction engine that processes the first instruction set in an instruction engine group. The first instruction engine corresponds to a first instruction cache in instruction caches.

Further, the program block dispatcher obtains an alternative instruction engine of the first instruction set based on the instruction processing request, where the alternative instruction engine is an instruction engine that can be configured to process the first instruction set. The program block dispatcher selects an instruction engine from the alternative instruction engine as the first instruction engine.

It should be noted that the alternative instruction engine may be pre-determined, for example, determined according to the foregoing PBT table. To be specific, the alternative instruction engine may include all IEs in a static IE group to which a program block to which the first instruction set belongs is mapped. Alternatively, the alternative instruction engine may be an IE dynamically added from a dynamic IE group to which the program block to which the first instruction set belongs is mapped based on a congested state of an instruction processing request queue corresponding to the IE in the static IE group.

Therefore, for different program blocks, the instruction engine group may be divided into a first alternative instruction engine group and a second instruction engine group. The first alternative instruction engine group may be a set of all IEs that have a static mapping relationship with the program block to which the first instruction set belongs, that is, the first alternative instruction engine group may be a static IE group. The second instruction engine group may be a set of all IEs that have a dynamic mapping relationship with the program block to which the first instruction set belongs, that is, the second instruction engine group may be a combination of a dynamic IE group and a disabled IE group.

The alternative instruction engine of the first instruction set may be determined in the following manner:

If the first instruction set is an instruction set on a non-performance path, the program block dispatcher uses an instruction engine in the first alternative instruction engine group as the alternative instruction engine of the first instruction set.

If the first instruction set is an instruction set on a performance path, the program block dispatcher uses an instruction engine in the first alternative instruction engine group or an instruction engine in the second instruction engine group as the alternative instruction engine of the first instruction set.

A program block (instruction set) on the non-performance path is mainly an instruction for processing an exception or a protocol packet, and generally does not occupy excessive traffic. Therefore, to ensure even allocation of resources, an IE for executing the instruction set on the non-performance path may be selected directly based on a preconfigured mapping relationship between the program block and the IE. In other words, an IE (an IE in the static IE group) that has a static mapping relationship with the program block is selected. However, execution of a program block (instruction set) on the performance path generally requires more traffic and resources. Therefore, an IE for executing the program block may be preferentially selected from IEs that have a static mapping relationship with the program block. If all the IEs that have the static mapping relationship with the program block are in a congested state, an IE for executing the program block may be selected from the IEs that have the dynamic mapping relationship with the program block. In this manner, in a processor with a plurality of IEs, program blocks can be more evenly executed in IEs as much as possible while ensuring minimum power consumption of the processor, thereby improving program execution efficiency of the processor and improving resource utilization of the processor.

Specifically, if the first instruction set is an instruction set on the performance path, the alternative instruction engine may be determined in the following manner:

If a first condition is met, the program block dispatcher uses the instruction engine in the first alternative instruction engine group as the alternative instruction engine of the first instruction set. The first condition is that a queue depth of an instruction processing request queue corresponding to at least one instruction engine in the first alternative instruction engine group is less than a first preset threshold.

Alternatively, if a second condition is met, the program block dispatcher uses the instruction engine in the second instruction engine group as the alternative instruction engine of the first instruction set. The second condition is that queue depths of instruction processing request queues corresponding to all instruction engines in the first alternative instruction engine group exceed the first preset threshold.

In other words, if a queue depth of an instruction processing request queue corresponding to an IE reaches the first preset threshold, for example, 16, it indicates that the IE is in a congested state and is not suitable for reallocating a new to-be-executed instruction set. If there is at least one IE that is not in the congested state in the first alternative instruction engine group, the instruction engine in the first alternative instruction engine group may still be used as the alternative instruction engine of the first instruction set. If there is no instruction engine that is not in the congested state in the first alternative instruction engine group, the instruction engine in the second instruction engine group may be used as the alternative instruction engine of the first instruction set. It should be understood that the first preset threshold is preset, and is a specified value used to determine whether the IE is congested, and the specified value may be changed based on an actual processing situation of the processor.

Further, to reduce power consumption of the processor, some IEs may be disabled, and the IEs are enabled only when the disabled IEs execute instructions, to execute the corresponding instructions. Therefore, the second instruction engine group may be divided into a second alternative instruction engine group and a third alternative instruction engine group. The second alternative instruction engine group may be a set of all IEs that have a dynamic mapping relationship with the program block to which the first instruction set belongs and the IEs are enabled, that is, the dynamic IE group. The third alternative instruction engine group may be a set of all IEs that have a dynamic mapping relationship with the program block to which the first instruction set belongs and the IEs are disabled, that is, the disabled IE group.

When the program block dispatcher uses the instruction engine in the second instruction engine group as the alternative instruction engine of the first instruction set, the program block dispatcher uses an instruction engine in the second alternative instruction engine group of the second instruction engine group as the alternative instruction engine of the first instruction set.

If a third condition is met, the program block dispatcher adds at least one instruction engine in the third alternative instruction engine group to the second alternative instruction engine group. The third condition may be that the second alternative instruction engine group is empty, or queue depths of instruction processing request queues corresponding to all instruction engines in the second alternative instruction engine group exceed a second preset threshold.

In other words, when the program block dispatcher uses the instruction engine in the second instruction engine group as the alternative instruction engine of the first instruction set, an IE is preferentially selected from the second alternative instruction engine group, in other words, the IE is selected from the dynamic IE group. When there is no IE that meets a requirement in the second alternative instruction engine group, an IE that meets the requirement is selected from the third alternative instruction engine group and extended to the second alternative instruction engine group, in other words, the IE that meets the requirement is selected from a disabled engine group, and a state of the IE is changed to an enabled state.

It should be noted that, for determining whether there is the IE that meets the requirement in the second alternative instruction engine group, a congested state of the IE may also be used as a determining condition. Similarly, the second preset threshold may be preset to determine whether the IE is congested. When the queue depths of the instruction processing request queues corresponding to all the instruction engines in the second alternative instruction engine group exceed the second preset threshold, there is no IE that meets the requirement can be selected from the second alternative instruction engine group. In this case, at least one IE needs to be extended from the third alternative instruction engine group.

To improve instruction execution efficiency, when an IE is extended from the third alternative instruction engine group, an IE that is not congested should be extended. The program block dispatcher selects, in the third alternative instruction engine group, at least one instruction corresponding to an instruction processing request queue whose queue depth is less than a third preset threshold, and adds the at least one instruction engine to the second alternative instruction engine group. It should be understood that the third preset threshold is also preset, and is a specified value used to determine whether the IE is congested, and the value may also be changed based on an actual processing situation of the processor.

It may be understood that the first preset threshold, the second preset threshold, and the third preset threshold are specified values respectively used to determine whether an instruction engine in the first alternative instruction engine group, an instruction engine in the second alternative instruction engine group, and an instruction engine in the third alternative instruction engine are congested, and the first preset threshold, the second preset threshold, and the third preset threshold may be the same, or may be different.

In addition, to reduce power consumption of the processor, for the program block to which the first instruction set belongs, if the program block selects an IE from the dynamic IE group for a small quantity of times, the IE in the dynamic IE group may be deleted, to reduce power consumption of the processor. Thus, the program block dispatcher records an instruction engine selection difference. The instruction engine selection difference indicates a quantity difference between a quantity of times of selecting an instruction engine from the first alternative instruction engine group and a quantity of times of selecting an instruction engine from the second alternative instruction engine group. In other words, the instruction engine selection difference indicates a quantity difference between a quantity of times of selecting an IE from the static IE group and a quantity of times of selecting an IE from the dynamic IE group. Therefore, the instruction engine selection difference may be recorded by using a DIFF_CNT field in a program block table.

If the instruction engine selection difference exceeds a fourth preset threshold, the program block dispatcher deletes all instruction engines in the second alternative instruction engine group. In other words, the instruction engine selection difference exceeds a specific value, where the value is the fourth preset threshold, and is a value determined based on an actual situation, for example, 500. When the instruction engine selection difference exceeds the fourth preset threshold, it indicates that there is a low probability that the program block to which the first instruction set belongs selects an instruction engine from the second alternative instruction engine group. Therefore, the program block dispatcher may configure IE_BM[n] in the program block table to 0, to disable all the instruction engines in the second alternative instruction engine group, thereby reducing power consumption of the processor.

The foregoing is a description of how to obtain the alternative instruction engine of the first instruction set. After obtaining the alternative instruction engine of the first instruction set, the program block dispatcher may select an instruction engine from the alternative instruction engine of the first instruction set as the first instruction engine to process the first instruction set. A specific selection manner is as follows: The program block dispatcher obtains a queue depth of an instruction processing request queue corresponding to the alternative instruction engine. The program block dispatcher selects an alternative instruction engine corresponding to an instruction processing request queue with a minimum queue depth as the first instruction engine.

S403: The program block dispatcher sends the instruction processing request to the first instruction cache corresponding to the first instruction engine.

The program block dispatcher may include a plurality of instruction processing request queues, the plurality of processing request queues are in a one-to-one correspondence with a plurality of instruction engines, and the plurality of instruction processing request queues are in a one-to-one correspondence with a plurality of instruction caches. The program block dispatcher may determine, based on an instruction processing request queue corresponding to the first instruction engine, the first instruction cache corresponding to the first instruction engine. In this way, a one-to-one correspondence between the first instruction engine and the first instruction cache is implemented, to be specific, the first instruction cache is configured to cache the instruction processed by the first instruction engine.

When the program block dispatcher determines that the first instruction set is processed by the first instruction engine, the program block dispatcher sends the PC in the instruction processing request to the first instruction cache, and the first instruction cache obtains the instruction of the first instruction set based on the PC, and sends the instruction to the first instruction engine for processing.

Certainly, there may be a case in which the instruction in the first instruction set is not hit in the first instruction cache. In this case, the first instruction cache may learn from an IMEM, to obtain the instruction in the first instruction set.

S404: The first instruction engine obtains the first instruction set from the first instruction cache.

After the first instruction cache obtains the first instruction set based on the PC in the instruction processing request, the first instruction cache may actively send the first instruction set to the first instruction engine for processing, so that the first instruction engine can obtain the first instruction set from the first instruction cache, to process the first instruction set. It should be understood that the first instruction cache and the first instruction engine may be connected through a hardware interface, so that the first instruction cache can send the first instruction set to the first instruction engine, or the first instruction engine obtains the first instruction set from the first instruction cache.

In addition, the multi-instruction engine-based instruction processing method provided in this embodiment of the present disclosure may further include: When the first instruction cache detects an end indicator (EI) of the first instruction set, the first instruction cache sends scheduling information to the program block dispatcher. The scheduling information indicates that the first instruction engine may process a next instruction processing request. In this case, the next instruction processing request may be fetched from the instruction processing request queue corresponding to the first instruction engine by using a round robin RR scheduler in the program block dispatcher, so that the next instruction processing request is processed by the first instruction engine.

When the first instruction engine detects the end indicator EI of the first instruction set, the first instruction engine ends processing of the first instruction set, and initiates a scheduling request to an output scheduler OS.

The output scheduler OS responds to the scheduling request, and determines whether execution of an entire program is completed. If the execution is completed, the output scheduler OS outputs a processing result to a post-stage module. Otherwise, the output scheduler OS sends an instruction processing request corresponding to a next to-be-executed program block to an input scheduler IS to continue processing, and the cycle is repeated in sequence.

The foregoing mainly describes, from a perspective of the processor, the multi-instruction engine-based instruction processing method provided in this embodiment of the present disclosure. It may be understood that, to implement the foregoing functions, the processor includes a corresponding hardware structure and/or a corresponding software module for performing each function. A person skilled in the art should easily be aware that the network element and algorithm steps in the examples described with reference to embodiments disclosed in this specification can be implemented in a form of hardware or a combination of hardware and computer software in this application. Whether a function is executed in a manner of hardware or computer software driving hardware depends on a specific application and a design constraint condition of the technical solution. A person skilled in the art may use different methods to implement the described functions for each specific application. However, it should not be considered that such implementation goes beyond the scope of the present disclosure.

In embodiments of the present disclosure, the processor may be divided into functional modules based on the foregoing method examples. For example, each functional module may be obtained through division based on each corresponding function, or two or more functions may be integrated into one processing module. The foregoing integrated module may be implemented in a form of hardware, or may be implemented in a form of a software functional module. It should be noted that division into the modules in embodiments of the present disclosure is an example, and is merely logical function division. In actual implementation, there may be another division manner.

An embodiment of the present disclosure further provides a processor. For a structure of the processor, refer to FIG. 2. The processor includes a program block dispatcher, an instruction cache group, and an instruction engine group. The instruction cache group includes a plurality of instruction caches, and the instruction engine group includes a plurality of instruction engines. The plurality of instruction caches in the instruction cache group are in a one-to-one correspondence with the plurality of instruction engines in the instruction engine group. The program block dispatcher is configured to receive an instruction processing request, where the instruction processing request is used to request the processor to process a first instruction set. The program block dispatcher is configured to determine a first instruction engine based on the instruction processing request, where the first instruction engine is an instruction engine that processes the first instruction set in the instruction engine group, and the first instruction engine corresponds to a first instruction cache in the instruction cache group. The program block dispatcher is configured to send the instruction processing request to the first instruction cache corresponding to the first instruction engine. The first instruction engine is configured to obtain the first instruction set from the first instruction cache.

Optionally, the processor further includes a plurality of instruction processing request queues, the plurality of instruction processing request queues are in a one-to-one correspondence with the plurality of instruction engines, and the plurality of instruction processing request queues are in a one-to-one correspondence with the plurality of instruction caches. The program block dispatcher is configured to determine, based on an instruction processing request queue corresponding to the first instruction engine, the first instruction cache corresponding to the first instruction engine. In this way, a one-to-one correspondence between the plurality of instruction engines and the plurality of instruction caches can be implemented by using the one-to-one correspondences of the instruction processing request queues.

Specifically, the program block dispatcher may be further configured to obtain an alternative instruction engine of the first instruction set based on the instruction processing request, where the alternative instruction engine is an instruction engine that can be configured to process the first instruction set. An instruction engine is selected from the alternative instruction engine as the first instruction engine.

Optionally, the instruction engine group may include a first alternative instruction engine group. The instruction engine group is further configured to: if the first instruction set is an instruction set on a non-performance path, use an instruction engine in the first alternative instruction engine group as the alternative instruction engine of the first instruction set.

Optionally, the instruction engine group may include a first alternative instruction engine group and a second instruction engine group. The program block dispatcher is further configured to: if the first instruction set is an instruction set on a performance path, use an instruction engine in the first alternative instruction engine group or an instruction engine in the second instruction engine group as the alternative instruction engine of the first instruction set.

Further, the program block dispatcher may be further configured to: if a first condition is met, use the instruction engine in the first alternative instruction engine group as the alternative instruction engine of the first instruction set, where the first condition may be that a queue depth of an instruction processing request queue corresponding to at least one instruction engine in the first alternative instruction engine group is less than a first preset threshold; or if a second condition is met, use the instruction engine in the second instruction engine group as the alternative instruction engine of the first instruction set, where the second condition may be that queue depths of instruction processing request queues corresponding to all instruction engines in the first alternative instruction engine group exceed the first preset threshold.

Further, the second instruction engine group may include a second alternative instruction engine group and a third alternative instruction engine group. The program block dispatcher may be further configured to: use an instruction engine in the second alternative instruction engine group of the second instruction engine group as the alternative instruction engine of the first instruction set; and if a third condition is met, add at least one instruction engine in the third alternative instruction engine group to the second alternative instruction engine group. The third condition may be that the second alternative instruction engine group is empty, or queue depths of instruction processing request queues corresponding to all instruction engines in the second alternative instruction engine group exceed a second preset threshold.

Optionally, the program block dispatcher may be further configured to: select, in the third alternative instruction engine group, at least one instruction engine corresponding to an instruction processing request queue whose queue depth is less than a preset threshold, and add the at least one instruction engine to the second alternative instruction engine group.

Optionally, the program block dispatcher may be further configured to record an instruction engine selection difference. If the instruction engine selection difference exceeds a fourth preset threshold, all instruction engines in the second alternative instruction engine group are deleted. The instruction engine selection difference indicates a quantity difference between a quantity of times of selecting an instruction engine from the first alternative instruction engine group and a quantity of times of selecting an instruction engine from the second alternative instruction engine group.

Specifically, the program block dispatcher may be further configured to: obtain a queue depth of an instruction processing request queue corresponding to the alternative instruction engine; and select an alternative instruction engine corresponding to an instruction processing request queue with a minimum queue depth as the first instruction engine.

In addition, the instruction cache may be further configured to: when detecting an end indicator of the first instruction set, send scheduling information to the program block dispatcher, where the scheduling information indicates that the first instruction engine may process a next instruction processing request.

In this embodiment of the present disclosure, each instruction engine in the processor may exclusively use a service of one instruction cache, so that the processor has stable and determined instruction fetch bandwidth, thereby improving instruction execution efficiency of the processor. In addition, when a program is executed by the processor, instructions in the program are divided into blocks, and different program blocks are sequentially allocated to different IEs for execution based on an execution sequence of the program, so that resource utilization of the processor can be improved, and replication of instructions between instruction caches can be reduced. This reduces costs and power consumption.

In addition, because the instruction caches and the instruction engines in the processor are bound one by one, the processor does not need a crossbar, and an instruction cache length of a single cache unit of an instruction cache may be set to be the same as an instruction length that can be processed in a single instruction cycle of an instruction engine in which the instruction cache and the instruction engine are bound together, so that settings of instruction queues Inst Q can be reduced, thereby reducing complexity of a processing procedure and reducing costs and power consumption of the processor.

Figure 5:
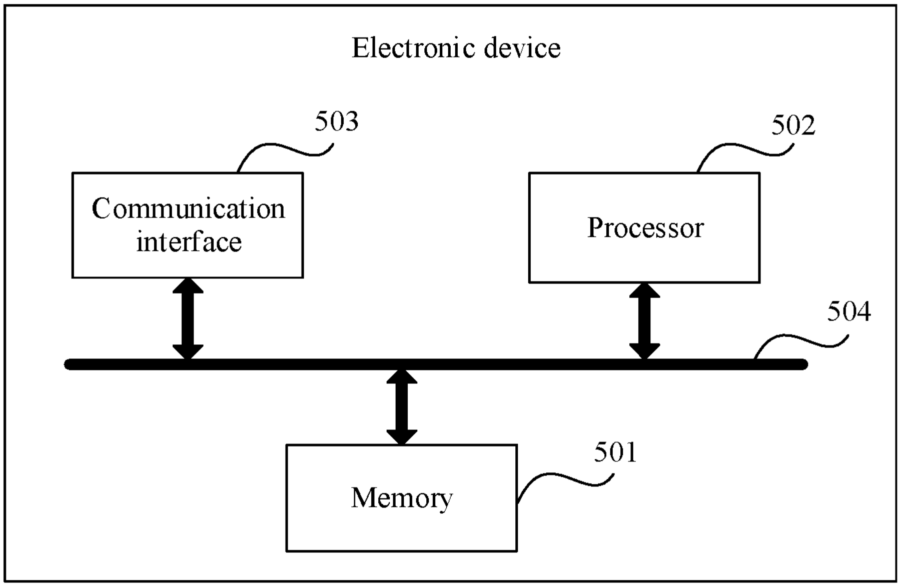
FIG. 5 is a schematic diagram of a structure of an electronic device according to an embodiment of the present disclosure.

As shown in FIG. 5, an embodiment of the present disclosure further provides an electronic device. Refer to FIG. 5. The electronic device includes a memory 501 and a processor 502. The memory 501 is configured to store program code and data of the device. The processor 502 is configured to control and manage an action of the device shown in FIG. 5. A structure of the processor 502 may be the structure shown in FIG. 2. For example, the processor 502 is further configured to support the instruction processor to perform S401 to S403 in the foregoing method embodiment, and/or is used in another process of the technology described in this specification. Optionally, the electronic device shown in FIG. 5 may further include a communication interface 503, and the communication interface 503 is configured to support the device to perform communication.

The processor 502 may be a central processing unit, a general-purpose processor, a digital signal processor, an application-specific integrated circuit, a processing chip, a field programmable gate array or another programmable logic device, a transistor logic device, a hardware component, or any combination thereof. The processor 502 may implement or execute various logical blocks, modules, and circuits described with reference to content disclosed in embodiments of the present disclosure. Alternatively, the processor 502 may be a combination of processors that implements a computing function, for example, a combination that includes one or more microprocessors, or a combination of a digital signal processor and a microprocessor. The communication interface 503 may be a transceiver, a transceiver circuit, a transceiver interface, or the like. The memory 501 may be a volatile memory, a non-volatile memory, or the like.

For example, the communication interface 503, the processor 502, and the memory 501 are connected to each other through a bus 504. The bus 504 may be a Peripheral Component Interconnect (PCI) bus, an Extended Industry Standard Architecture (EISA) bus, or the like. The bus 504 may be classified into an address bus, a data bus, a control bus, and the like. For ease of representation, only one bold line is used to represent the bus in FIG. 5, but this does not mean that there is only one bus or only one type of bus. Optionally, the memory 501 may be included in the processor 502.

Finally, it should be noted that the foregoing descriptions are merely specific implementations of the present disclosure, but are not intended to limit the protection scope of the present disclosure. Any variation or replacement within the technical scope disclosed in this application shall fall within the protection scope of the present disclosure. Therefore, the protection scope of the present disclosure shall be subject to the protection scope of the claims.

What is claimed is:

1. A method implemented by a processor, the method comprising:

receiving an instruction processing request to process a first instruction set of a computer program;

accessing a program block table of the computer program, wherein the program block table is from compiling the computer program, wherein the program block table specifies a performance path indicator for the first instruction set, and wherein the performance path indicator identifies whether the first instruction set is on a performance path or a non-performance path;

determining, from an instruction engine group of the processor, based on the instruction processing request, and based on the program block table, including based on the performance path indicator specified by the program block table, a first instruction engine for processing the first instruction set, wherein the program block table further specifies a mapping relationship between the first instruction set and candidate instruction engines in the instruction engine group, wherein the instruction engine group comprises a first alternative instruction engine group, and wherein determining the first instruction engine comprises:

comparing queue depths of instruction processing request queues corresponding to the candidate instruction engines; and engines;

selecting, as the first instruction engine, a candidate instruction engine having a minimum queue depth;

obtaining, based on the instruction processing request, an alternative instruction engine for processing the first instruction set by using, when the first instruction set is on the non-performance path, a selected instruction engine in the first alternative instruction engine group as the alternative instruction engine of the first instruction set; and selecting the alternative instruction engine as the first instruction engine;

sending the instruction processing request to a first instruction cache of an instruction cache group of the processor, wherein the first instruction cache corresponds to the first instruction engine, and wherein the instruction cache group and the instruction engine group are in one-to-one correspondence such that each instruction cache in the instruction cache group corresponds to a respective instruction engine in the instruction engine group;

obtaining the first instruction set from the first instruction cache; and executing an instruction in the first instruction set.

2. The method of claim 1, wherein the instruction engine group further comprises a first alternative instruction engine group and a second instruction engine group, and wherein obtaining the alternative instruction engine of the first instruction set based on the instruction processing request further comprises using, when the first instruction set is an instruction set on the performance path, a first selected instruction engine in the first alternative instruction engine group or a second selected instruction engine in the second instruction engine group as the alternative instruction engine of the first instruction set.

3. The method of claim 2, wherein using the first selected instruction engine in the first alternative instruction engine group or the second selected instruction engine in the second instruction engine group as the alternative instruction engine of the first instruction set comprises:

using when a first condition is met, the first selected instruction engine in the first alternative instruction engine group as the alternative instruction engine of the first instruction set, wherein the first condition is that a queue depth of an instruction processing request queue corresponding to at least one instruction engine in the first alternative instruction engine group is less than a first preset threshold.

4. The method of claim 2, wherein the second instruction engine group comprises a second alternative instruction engine group and a third alternative instruction engine group, and wherein using the second selected instruction engine in the second instruction engine group as the alternative instruction engine of the first instruction set comprises:

using the second selected instruction engine in the second alternative instruction engine group of the second instruction engine group as the alternative instruction engine of the first instruction set; and adding when a third condition is met, at least one instruction engine in the third alternative instruction engine group to the second alternative instruction engine group, wherein the third condition is that the second alternative instruction engine group is empty, or queue depths of instruction processing request queues corresponding to all instruction engines in the second alternative instruction engine group exceed a second preset threshold.

5. The method of claim 4, further comprising:

selecting in the third alternative instruction engine group, at least one instruction engine corresponding to an instruction processing request queue whose queue depth is less than a third preset threshold; and adding the at least one instruction engine to the second alternative instruction engine group.

6. The method of claim 4, further comprising:

recording an instruction engine selection difference; and deleting when the instruction engine selection difference exceeds a fourth preset threshold, all instruction engines in the second alternative instruction engine group, wherein the instruction engine selection difference indicates a quantity difference between a first quantity of times of selecting the first selected instruction engine from the first alternative instruction engine group and a second quantity of times of selecting the second selected instruction engine from the second alternative instruction engine group.

7. The method of claim 1, further comprising:

sending, when the first instruction cache detects an end indicator of the first instruction set, scheduling information, wherein the scheduling information indicates that the first instruction engine can process a next instruction processing request.

8. An apparatus comprising:

a memory configured to store instructions and a computer program; and a processor coupled to the memory and comprising:

an instruction cache group comprising a plurality of instruction caches; and an instruction engine group comprising a plurality of instruction engines, wherein the plurality of instruction caches in the instruction cache group are in a one-to-one correspondence with the plurality of instruction engines in the instruction engine group, wherein the instructions, when executed by the processor, cause the processor to implement a program block dispatcher, wherein the program block dispatcher is configured to:

receive an instruction processing request to process a first instruction set of a computer program;

access a program block table of the computer program, wherein the program block table is from compiling the computer program, wherein the program block table specifies a performance path indicator for the first instruction set, and wherein the performance path indicator identifies whether the first instruction set is on a performance path or a non-performance path;

determine a first instruction engine based on the instruction processing request and based on the program block table, including based on the performance path indicator specified by the program block table, wherein the program block table further specifies a mapping relationship between the first instruction set and candidate instruction engines in the instruction engine group, wherein the instruction engine group comprises a first alternative instruction engine group, and wherein determining the program block dispatcher is further configured to determine the first instruction engine comprises by:

comparing queue depths of instruction processing request queues corresponding to the candidate instruction engines; and engines;

selecting, as the first instruction engine, a candidate instruction engine having a minimum queue depth;

obtaining, based on the instruction processing request, an alternative instruction engine for processing the first instruction set by using, when the first instruction set is on the non-performance path, a selected instruction engine in the first alternative instruction engine group as the alternative instruction engine of the first instruction set; and selecting the alternative instruction engine as the first instruction engine; and send the instruction processing request to a first instruction cache corresponding to the first instruction engine, wherein the first instruction engine processes the first instruction set in the instruction engine group, and wherein the first instruction engine is configured to obtain the first instruction set from the first instruction cache and execute an instruction in the first instruction set.

9. The apparatus of claim 8, wherein the processor further comprises a plurality of instruction processing request queues in a one-to-one correspondence with the plurality of instruction engines, wherein the plurality of instruction processing request queues are further in a one-to-one correspondence with the plurality of instruction caches, wherein the program block dispatcher is further configured to determine, based on an instruction processing request queue corresponding to the first instruction engine, the first instruction cache corresponding to the first instruction engine.

10. The apparatus of claim 8, wherein the instruction engine group further comprises a first alternative instruction engine group and a second instruction engine group; and the program block dispatcher is further configured to use, when the first instruction set is an instruction set on the performance path, a first selected instruction engine in the first alternative instruction engine group or a second instruction engine in the second instruction engine group as the alternative instruction engine of the first instruction set.

11. The apparatus of claim 10, wherein the program block dispatcher is further configured to:

use, when a second condition is met, the second instruction engine in the second instruction engine group as the alternative instruction engine of the first instruction set, wherein the second condition is that queue depths of instruction processing request queues corresponding to all instruction engines in the first alternative instruction engine group exceed a first preset threshold.

12. The apparatus of claim 10, wherein the second instruction engine group comprises a second alternative instruction engine group and a third alternative instruction engine group, and wherein the program block dispatcher is specifically configured to:

use an instruction engine in the second alternative instruction engine group of the second instruction engine group as the alternative instruction engine of the first instruction set; and add, when a third condition is met, at least one third instruction engine in the third alternative instruction engine group to the second alternative instruction engine group, wherein the third condition is that the second alternative instruction engine group is empty, or queue depths of instruction processing request queues corresponding to all instruction engines in the second alternative instruction engine group exceed a second preset threshold.

13. The apparatus of claim 12, wherein the program block dispatcher is further configured to:

select, in the third alternative instruction engine group, at least one fourth instruction engine corresponding to an instruction processing request queue whose queue depth is less than a third preset threshold;

add the at least one fourth instruction engine to the second alternative instruction engine group;

record an instruction engine selection difference; and delete, when the instruction engine selection difference exceeds a fourth preset threshold, all instruction engines in the second alternative instruction engine group, wherein the instruction engine selection difference indicates a quantity difference between a first quantity of times of selecting the first instruction engine from the first alternative instruction engine group and a second quantity of times of selecting the second instruction engine from the second alternative instruction engine group.

14. A computer program product comprising a computer program that, when executed by a processor, causes an electronic device to:

receive an instruction processing request to process a first instruction set of the computer program;

access a program block table of the computer program, wherein the program block table is from compiling the computer program, and wherein the program block table specifies a performance path indicator for the first instruction set, and wherein the performance path indicator identifies whether the first instruction set is on a performance path or a non-performance path;

determine, from an instruction engine group, based on the instruction processing request, and based on the program block table, including based on the performance path indicator specified by the program block table, a first instruction engine for processing the first instruction set, wherein the program block table further specifies a mapping relationship between the first instruction set and candidate instruction engines in the instruction engine group, wherein the instruction engine group comprises a first alternative instruction engine group, and wherein the computer program, when executed by the processor, further causes the electronic device to determine the first instruction engine by:

comparing queue depths of instruction processing request queues corresponding to the candidate instruction engines; and engines;

selecting, as the first instruction engine, a candidate instruction engine having a minimum queue depth;

obtaining, based on the instruction processing request, an alternative instruction engine for processing the first instruction set by using, when the first instruction set is an instruction set on the non-performance path, a selected instruction engine in the first alternative instruction engine group as the alternative instruction engine of the first instruction set; and selecting the alternative instruction engine as the first instruction engine;

send the instruction processing request to a first instruction cache of an instruction cache group, wherein the first instruction cache corresponds to the first instruction engine, and wherein the instruction cache group and the instruction engine group are in one-to-one correspondence such that each instruction cache in the instruction cache group corresponds to a respective instruction engine in the instruction engine group; and group;

obtain the first instruction set from the first instruction cache; and executing an instruction in the first instruction set.

15. The computer program product of claim 14, wherein the computer program, when executed by the processor, further causes the electronic device to send, when the first instruction cache detects an end indicator of the first instruction set, scheduling information, wherein the scheduling information indicates that the first instruction engine can process a next instruction processing request.

16. The computer program product of claim 14, wherein the instruction engine group further comprises a second instruction engine group, and wherein obtaining the alternative instruction engine of the first instruction set based on the instruction processing request further comprises using, when the first instruction set is on the performance path, a first selected instruction engine in the first alternative instruction engine group or a second selected instruction engine in the second instruction engine group as the alternative instruction engine of the first instruction set.

17. The computer program product of claim 16, wherein using the first selected instruction engine in the first alternative instruction engine group or the second selected instruction engine in the second instruction engine group as the alternative instruction engine of the first instruction set comprises:

using when a first condition is met, the first selected instruction engine in the first alternative instruction engine group as the alternative instruction engine of the first instruction set, wherein the first condition is that a queue depth of an instruction processing request queue corresponding to at least one instruction engine in the first alternative instruction engine group is less than a first preset threshold.

18. The computer program product of claim 16, wherein the second instruction engine group comprises a second alternative instruction engine group and a third alternative instruction engine group, and wherein using the second selected instruction engine in the second instruction engine group as the alternative instruction engine of the first instruction set comprises:

using the second selected instruction engine in the second alternative instruction engine group of the second instruction engine group as the alternative instruction engine of the first instruction set; and adding when a third condition is met, at least one instruction engine in the third alternative instruction engine group to the second alternative instruction engine group, wherein the third condition is that the second alternative instruction engine group is empty, or queue depths of instruction processing request queues corresponding to all instruction engines in the second alternative instruction engine group exceed a second preset threshold.

19. The computer program product of claim 18, wherein the computer program, when executed by the processor, further causes the electronic device to:

select in the third alternative instruction engine group, at least one instruction engine corresponding to an instruction processing request queue whose queue depth is less than a third preset threshold; and add the at least one instruction engine to the second alternative instruction engine group.

20. The computer program product of claim 18, wherein the computer program, when executed by the processor, further causes the electronic device to:

record an instruction engine selection difference; and delete when the instruction engine selection difference exceeds a fourth preset threshold, all instruction engines in the second alternative instruction engine group, wherein the instruction engine selection difference indicates a quantity difference between a first quantity of times of selecting the first selected instruction engine from the first alternative instruction engine group and a second quantity of times of selecting the second selected instruction engine from the second alternative instruction engine group.

* * * * *